United States Patent [19]
Abrams

[11] Patent Number: 5,357,998
[45] Date of Patent: Oct. 25, 1994

[54] SAFETY SYSTEM FOR FLUID CONDUIT

[75] Inventor: Joseph Abrams, Bala Cynwyd, Pa.

[73] Assignee: Woodland Technologies, Inc., Bala Cynwyd, Pa.

[21] Appl. No.: 983,540

[22] PCT Filed: Aug. 19, 1991

[86] PCT No.: PCT/US91/05707
§ 371 Date: Feb. 19, 1993
§ 102(e) Date: Feb. 19, 1993

[87] PCT Pub. No.: WO92/03679
PCT Pub. Date: Mar. 5, 1992

[51] Int. Cl.⁵ .............................................. F16K 17/40
[52] U.S. Cl. ................................ 137/68.1; 137/614.04
[58] Field of Search ........................... 137/68.1, 614.04

[56] References Cited
U.S. PATENT DOCUMENTS

| | | |
|---|---|---|
| 1,304,364 | 5/1919 | Phillips et al. |
| 3,273,578 | 9/1966 | Clark ................................ 137/68.1 |
| 3,630,214 | 12/1971 | Levering ............................ 137/68.1 |
| 3,859,692 | 1/1975 | Waterman et al. ...................... 24/73 |
| 4,098,438 | 7/1978 | Taylor ............................ 137/68.1 X |
| 4,827,977 | 5/1989 | Fink .............................. 137/614.04 |
| 4,886,087 | 12/1989 | Kitchen ............................ 137/68.1 |

Primary Examiner—Stephen M. Hepperle
Attorney, Agent, or Firm—Stuart E. Beck

[57] ABSTRACT

A fluid conduit safety system which comprises valves at each end of the conduit which are connected by a cable. If the hose ruptures, the valves close preventing discharge of fluid from the fluid supply and discharge of fluid from the container being filled while at the same time the cable prevents the ends of the hose from whipping about and causing damage or injury. Another aspect of the invention relates to a method for stopping the flow of fluid through a conduit which fails which comprises the steps of providing a conduit with a valve at each end and means connecting the valves to each other and disposed in the conduit.

25 Claims, 1 Drawing Sheet

SAFETY SYSTEM FOR FLUID CONDUIT

BACKGROUND OF THE INVENTION

Field of the Invention

This invention relates to high pressure fluid delivery systems and more particularly to a safety system for a conduit which is part of the high pressure delivery system.

A prevailing problem in high pressure fluid delivery systems, such as those used to fill containers with compressed gases such as oxygen, nitrogen, carbon dioxide and the like is the risk that a conduit which is part of the fluid delivery system may fail.

Typically, these conduits are made of hardy flexible material, such as treated and reinforced rubber, neoprene, nylon, TEFLON, stainless steel and the like.

However, on occasion, the conduits fail by rupturing or splitting. When a hose ruptures, two hazards are present. First, the two pieces of the conduit which result from the rupture are free to whip around wildly under the force of the compressed gases which are being discharged through the ruptured conduit from the container being filled and from the discharge manifold of the fluid supply. Until the conduit can be constrained, substantial risk of injury to personnel and damage to equipment exists.

Further, a discharge of gas from the manifold and the container through the ruptured hose conduit can lead to a costly waste of gas, or even worse, can fill an environment with hazardous fumes.

It would be desirable to have a system which would restrain a ruptured high pressure conduit from whipping about, and at the same time would be capable of preventing gases from leaking from the conduit through the rupture.

SUMMARY OF THE INVENTION

With the foregoing in mind the invention relates to a fluid conduit safety system comprising a flexible conduit. A valve is at each end of the conduit. Each valve includes a valve seat and a valve body. The valve bodies are retained at fixed predetermined distance from each other which distance is slightly greater than the distance between the valve seats so that in normal operation the compressed fluid can pass between the valve and valve seat at each end of the conduit.

If the conduit were to rupture or split, relative movement between the valves and the valve seats under the force of the compressed fluid will cause the valves at each end of the conduit to close thus blocking flow of the fluid.

In yet another aspect of the invention the valve bodies are retained at their predetermined distance from each other by an elongated cable that extends between them and through the conduit. Thus, if the conduit were to rupture, the cable would prevent the ends of the hose from whipping.

In yet another aspect, the invention relates to a method for stopping the flow of fluid through a conduit which has failed and preventing the conduit from whipping. It comprises the steps of providing a flexible conduit with a first valve member at each end of the conduit where the first valve members are spaced from each other a predetermined distance. A second valve member is provided adjacent each of the first valve members with means for retaining the second valve members a second predetermined distance from each other which second distance is greater than the distance between the first valve members. Means are provided for restraining the second valve members from moving relative to the conduit until the conduit fails whereupon the first and second valve members engage each other and block flow through the conduit.

BRIEF DESCRIPTION OF THE DRAWING

The invention will be better understood and further advantages and uses thereof will be readily apparent when considered in view of the following detailed description of an exemplary embodiment, taken with the accompanying drawing in which:

In FIG. 1 a delivery system for filling containers with compressed fluids is illustrated as comprising fluid supply 10 such as a reservoir, or fluid compressing means, or the like. The supply 10 may be connected by a discharge manifold 12 to a plurality of containers 14 to which the fluid is to be transferred. Typically, the containers 14 may be gas cylinders which are well known in the art. Conduits 20 which may be elongated flexible members are connected between the discharge manifold 12 and the containers 14.

Typically, the conduits 20 are hoses made of reinforced neoprene, rubber, neoprene, nylon, TEFLON, stainless steel and the like so that they have a high degree of flexibility and are capable of withstanding the high pressures which they encounter from the compressed fluids that move through them.

Figure 1:
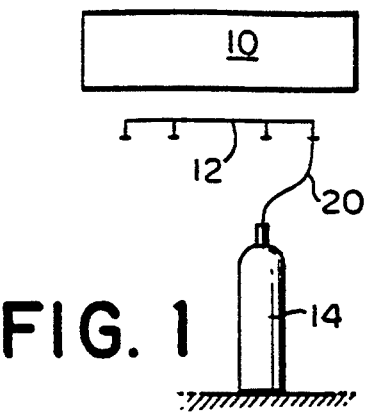
FIG. 1 is a schematic drawing of an apparatus for filling cylinder with compressed fluid under high pressure.
Figure 2:
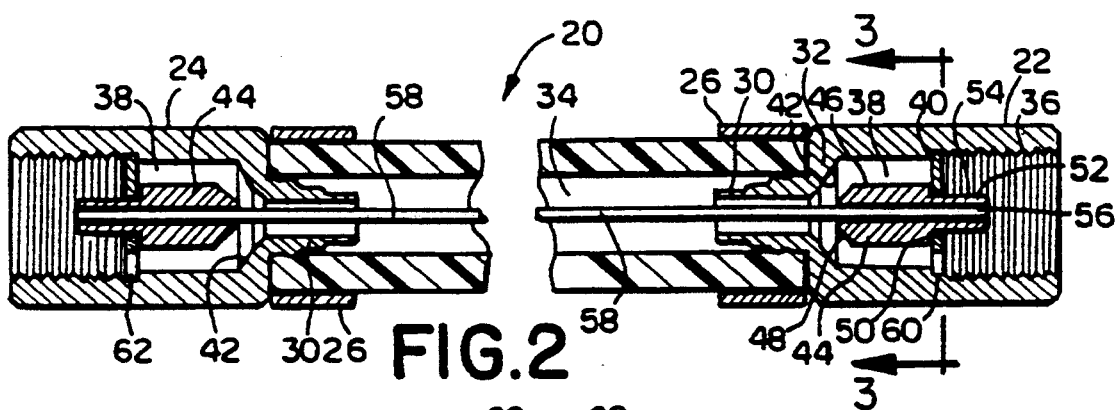
FIG. 2 is a view of a conduit constructed in accordance with a presently preferred form of the invention with the valves therein positioned to permit fluid flow.

In FIG. 2 one of the conduits 20 is shown in detail. The conduit 20 includes a housing 22 at one end and an identical housing 24 at its other end. The housings 22 and 24 are connectors which enable the conduit 20 to be connected other elements in the fluid handling system. Since the two housings are identical, the following detailed description of housing 22 will also suffice as a description of housing 24. Housing 22 is connected to conduit 20 by a ferrule 26 which cooperates with a complementary elongated cylindrical hollow member 30 that extends from the end wall 32 of the housing 22 and into the passage 34 defined by the conduit 20.

As best seen in FIG. 2 the housing 22 is an elongated, hollow, cylindrical element which is connected by end wall 32 and member 30 to the conduit 20 and has threads 36 at its other end for connection to another element in the fluid handling system.

The housing 22 has an inner wall that includes a valve chamber 38 which is defined by a ledge 40 that faces away from end wall 32 and a tapered valve seat 42 that lies adjacent end wall 32. The tapered valve seat 42 lies between the ledge 40 and the end wall 32 and faces ledge 40.

As explained above, member 30 cooperates with the ferrule 26 to clamp the conduit 20 between them so that the housing 22 is securely connected to the conduit 20 for the receipt of and transmission of fluid under high pressure. It also serves as a cable guide as will be explained herein.

A valve body 44 is disposed in the valve chamber 38. Preferably, the valve body 44 includes an elongated, cylindrical member 46 having a tapered end 48 and a rear wall 50. The taper at end 48 corresponds to the taper of the valve seat 42 so that they can cooperate to prevent the flow of fluid when they are in engagement with each other.

A distal end 52 extends from the rear wall 50 of the valve body 40 and comprises an elongated stem-like member 54 of relatively small diameter relative to the elongated, cylindrical member 46. Stem-like member 54 extends away from the valve seat 40.

Each of the valve bodies 44 and stem-like members 54 include a longitudinally extending, axial passage 56 of relatively small diameter through which a relatively stiff cable 58 or other suitable flexible and bendable member of predetermined length can be received. The valve body 44 may be connected to the cable 58 by swaging, welding, or other suitable means so that the cable 58 cannot separated from the valve body 44 under the strong forces which will be present should the conduit 20 rupture.

Figure 3:
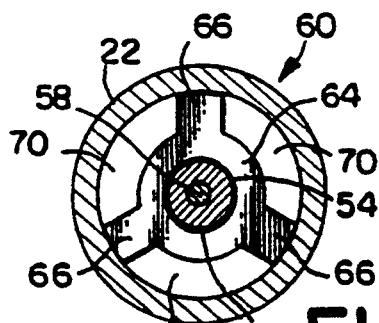
FIG. 3 is a section view taken along lines 4—4 of FIG. 2.

Referring to FIGS. 2 and 3 valve body retainers 60 and 62 are provided in housings 22 and 24 respectively. Since the two retainers 60 and 62 are identical the following detailed description of retainer 60 will also suffice as a description of retainer 62.

Referring to FIG. 3, retainer 60 is a disc that includes a generally annular central member 64 having a plurality of arms 66 extending radially outwardly from it. The center of the annular member 64 comprises an aperture 68.

Retainers 60 and 62 are disposed on ledges 40 in each housing 22 and 24. Each retainer is fixed on the ledge by being force fit, clamped, welded or secured by any suitable means that will hold it in place for a reason that will become apparent. The distance between the retainers 60 and 62 is about the same as the distance between the rear walls 50 of the valve bodies 44.

As best seen in FIG. 2 the member 30 and the stiffness of the cable 58 cause the valve bodies 44 to lie with their rear walls 50 against their respective retainers 60 and 62 with their respective stems 54 extending through the apertures 68.

Under normal operating conditions, compressed fluids flow through conduit 20, through the fluid passages 70 defined by the space between the arms 66 on each retainer 60 and 62 and the inner wall of the housings 22 and 24, and through the opening between each valve seat 42 and its respective valve body 44.

Since the cable 58 is confined by the wall of conduit 20, and is long enough arid sufficiently stiff to keep the valve bodies in engagement with the retainers 60 and 62, as is apparent from FIG. 2, neither valve body can move within its chamber since such movement is blocked by the retainer at the other end of the conduit.

Figure 4:
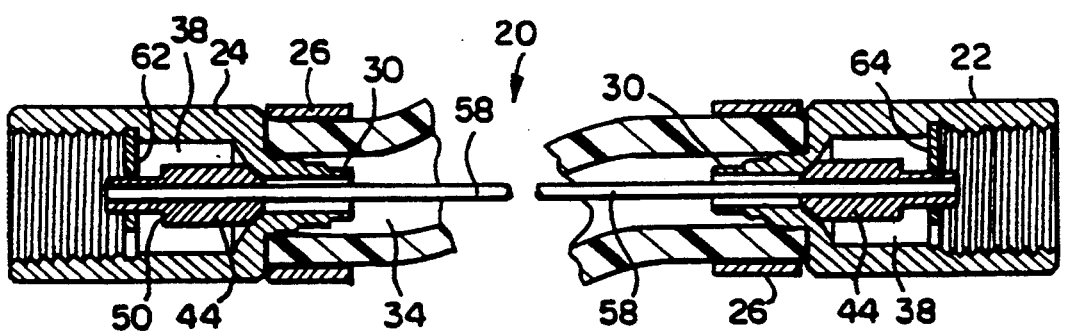
FIG. 4 is a view similar to FIG. 3 but showing the valves positioned to block fluid flow.

Should the conduit 20 fail by either splitting or by rupture, the valve bodies 44 and valve seats 42 will move into engagement with each other thereby stopping the flow through the conduit 20 at each of its ends as seen in FIG. 4. Accordingly, not only will discharge from the supply manifold be stopped, but also discharge from the container being filled will be stopped.

If the supply 10 or one of the containers 14 should fall during filling, the conduit 20 may fail. In this case the ends of the conduit will move with the item to which they are connected. Therefore, the valve seats 42 will be drawn away from each other and into engagement with their respective valve bodies 44 since the cable 58 will be drawn taut by the movement the conduit ends away from each other.

If the supply 10 and containers 14 are fixed, they will not be displaced when the conduit fails. In this case the valve bodies 44 will be urged into engagement with their respective valve seats 42 due to the pressure differential across the valve bodies 44 in that there is still high pressure fluid in the supply 10 and container 14 bearing against the valve bodies 44. When conduit 20 fails, cable 58 is released from its confinement within the conduit and can flex to permit the valve bodies 44 to move toward the valve seats 42. Further, because the cable 58 extends through the conduit 20, it will serve as a guide for a ruptured conduit, thereby preventing the ends of the conduit from being whipped about by the discharging fluid. Still further, even if the cable were to fail as a result of the rupture, fluid flow will still be stopped at each end of the conduit since the cable 58 will not be holding the valve bodies 44 apart. It is significant to note that the advantages of the invention are achieved by a structure that is entirely within the conduit. Thus, there is no external apparatus that might be inadvertently snagged, damaged or destroyed thereby rendering the features of the invention unavailable when needed.

Still further, it is apparent that the device and method disclosed can be used with conduits of varying sizes and materials.

Thus, while the invention has been described with respect to a particular embodiment, it is apparent that other embodiments can be employed to achieve the intended results. Thus, the scope of the invention should not be limited by the foregoing description, but rather only by the scope of the claims appended hereto.

I claim:

1. A safety system for a fluid conduit comprising a flexible conduit having first and second ends, first means at each end of said conduit defining a valve seat, said valve seats normally being a first predetermined distance from each other, and being movable away from each other when said conduit fails, a valve body disposed at each end, said valve seats being disposed between said valve bodies, said valve bodies and said valve seats cooperating to define valves, second means connected to said valve bodies for holding them apart a second distance which is greater than the distance between said valve seats, third means disposed at each of said ends and cooperating with said second means for retaining said valve bodies against movement to permit fluid to flow through said conduit until said conduit fails, and said second means is operative when said conduit fails and said valve seats move away from each other to retain said valve bodies at said second distance so that said valve seats move toward said valve bodies and close said valves, or if the distance between said valve seats does not change, to permit said valve bodies to move toward each other so that said valve bodies move toward said valve seats to close said valves.

2. A system as defined in claim 1 wherein said second means is connected between said valve bodies, and said valve bodies are disposed between said third means and said valve seats.

3. A system as defined in claim 2 wherein said second means comprises an elongated, stiff, yet flexible member that extends through said conduit.

4. A system as defined in claim 1 wherein said first means comprises a housing, said housing including means for connecting it to a conduit and a valve chamber, and fourth means, said fourth means being defined by said housing and being for retaining said third means in said housing.

5. A system as defined in claim 4 wherein said third means comprises a generally annular member that defines a plurality of fluid passages to enable fluid to flow therethrough, and a portion of said third means is engagable with said valve bodies for supporting and guiding said valve bodies.

6. A system as defined in claim 5 wherein said portion of said third means includes an aperture.

7. A system as defined in claim 6 wherein said second means comprises an elongated, stiff, yet flexible cable extending through said conduit.

8. A system as defined in claim 5 wherein said housing includes an inner wall, said fourth means comprises a ledge defined by said inner wall, and said third means is supported by said ledge.

9. A safety system for a fluid conduit comprising a flexible conduit having first and second ends, first means comprising a housing at each end of said conduit, said housings defining valve seats and including means for connecting them to a conduit and a valve chamber, and said valve seats being a first predetermined distance from each other, a valve body disposed at each end, said valve seats being disposed between said valve bodies, an elongated, stiff, yet flexible member extending through said conduit and being connected to said valve bodies, third means comprising a generally annular member that defines a plurality of fluid passages to enable fluid to flow therethrough, said third means being disposed at each of said ends of said conduit and cooperating with said elongated, stiff, yet flexible member to retain said valve bodies at said a second distance which is greater than the distance between said valve seats to permit fluid to flow through said conduit until said conduit fails, a portion of said third means is engagable with said valve bodies for supporting and guiding said valve bodies, and fourth means, said fourth means being defined by said housing and being for retaining said third means in said housing.

10. A system as defined in claim 9 wherein said portion of said third means includes an aperture, said valve body including a valve body stem, and said valve body stem is slidably received in said aperture.

11. A safety system for a fluid conduit comprising a flexible conduit having first and second ends, first means at each end of said conduit defining a valve seat, said valve seats being a first predetermined distance from each other, a valve body disposed at each end, said valve seats being disposed between said valve bodies, second means connected to said valve bodies for holding them apart a second distance which is greater than the distance between said valve seats, said second means being connected between said valve bodies and comprising an elongated, stiff, yet flexible member that extends through said conduit, third means disposed at each of said ends for retaining said valve bodies against movement toward their respective seats to permit fluid to flow through said conduit until said conduit fails, and said valve bodies are disposed between said third means and said valve seats.

12. A safety system for a fluid conduit comprising a flexible conduit having first and second ends, first means at each end of said conduit defining a first valve member, said first valve members normally being a first predetermined distance from each other, a second valve member disposed at each end, said first valve members being disposed between said second valve members, and said first and second valve members cooperate to define valves, second means connected to said second valve members for holding them apart a second distance which is greater than the distance between said first valve members until said conduit fails, third means disposed at each of said ends and cooperating with said second means for retaining said second valve members against movement toward their respective first valve members to permit fluid to flow through said conduit until said conduit fails, said second means is operative under first and second conditions to enable said valves to close when said conduit fails, said first condition being when the distance between said first valve members increases after said failure whereupon said second means causes said first valve members to move toward said second valve members, said second condition being when the distance between said first valve members does not change after said failure whereupon said second means flexes to enable said second valve members to move toward said first valve members.

13. A system as defined in claim 12 wherein said second means comprises an elongated, stiff, yet flexible member that extends through said conduit.

14. A system as defined in claim 12 wherein said third means comprises a generally annular member that defines a plurality of fluid passages to enable fluid to flow therethrough, and a portion of said third means is engagable with said valve bodies for supporting and guiding said valve bodies.

15. A system as defined in claim 13 wherein said second means comprises a cable that extends through said conduit.

16. A method for stopping the flow of fluid through a conduit which fails comprising the steps of providing a conduit having an inner wall, said conduit including means defining two valve seats which are spaced from each other a first distance, providing a valve body for each of said valve seats, retaining said valve bodies a second distance from each other by an elongated, stiff, yet flexible member that extends through said conduit and engages said inner wall, said second distance being greater than said first distance, and moving said valve seats and said valve bodies into engagement with each other under the force of said fluid when either said conduit, or said conduit and said elongated, stiff, yet flexible member fails.

17. A method as defined in claim 16 wherein
said elongated, stiff, yet flexible member prevents the ends of the conduit from whipping when only said conduit fails.

18. A method for stopping the flow of fluid through a conduit which fails and for preventing the ends of the conduit from whipping comprising the steps of
providing a flexible conduit,
providing a first valve member at each end of said conduit, said first valve members being spaced from each other a first predetermined distance,
providing a second valve member adjacent each of said first valve members,
retaining said second valve members a second predetermined distance from each other,
said second valve members being retained at said second predetermined distance by providing a elongated, stiff, yet flexible elongated member in said conduit and connecting each end of said elongated, stiff, yet flexible member to one of said second valve members, said second predetermined distance being greater than said first predetermined distance, and
restraining said second valve members from moving relative to said conduit until said conduit fails whereupon said fluid causes said second valve members to engage said first valve members while said first valve members are still at said second predetermined distance, and
said elongated, stiff, yet flexible member is operative to prevent the ends of said hose from whipping when said conduit fails.

19. The method as defined in claim 18 including the step of providing
a valve housing at each end of said conduit and said valve bodies and said valve seats are in said valve housings.

20. The method as defined in claim 18 wherein the fluid is a compressed gas.

21. A method for stopping the flow of fluid through a conduit which fails and for preventing the ends of the conduit from whipping comprising the steps of
providing a flexible conduit,
providing a valve seat at each end of said conduit, said valve seats being spaced from each other a first predetermined distance,
providing a valve body adjacent each of said valve seats,
retaining said valve bodies a second predetermined distance from each other by providing a elongated, stiff, yet flexible member in said conduit and connecting each end of said elongated, stiff yet flexible member to one of said valve bodies where the distance between said valve bodies is greater than the distance between said valve seats, and
restraining said valve bodies from moving relative to said conduit until said conduit fails whereupon said elongated, stiff, yet flexible member enables said valve bodies and said valve seats to engage each other.

22. The method as defined in claim 21 including the step of providing
a valve housing at each end of said conduit, and
said valve bodies and said valve seats are in said valve housings.

23. The method as defined in claim 21 wherein the fluid is a compressed gas.

24. The method as defined in claim 21 wherein
said elongated, stiff, yet flexible member enables said valve bodies and said valve seats to engage each other by flexing when said conduit fails so that said valve bodies can move toward said valve seats.

25. The method as defined in claim 21 wherein
said elongated, stiff, yet flexible member enables said valve bodies and said valve seats to engage each other by becoming taut when said conduit fails so that said valve seats can move toward said valve bodies.

* * * * *

UNITED STATES PATENT AND TRADEMARK OFFICE
CERTIFICATE OF CORRECTION

PATENT NO. : 5,357,998
DATED : October 25, 1994
INVENTOR(S) : Joseph Abrams

It is certified that error appears in the above-indentified patent and that said Letters Patent is hereby corrected as shown below:

On the title page, insert before item [51], item [63] to read as follows:

This application is a continuation in part of U. S. application Ser. No. 07/571,205 filed August 23, 1990 and now abandoned.

Signed and Sealed this

Twenty-ninth Day of August, 1995

Attest:

BRUCE LEHMAN

*Attesting Officer*     *Commissioner of Patents and Trademarks*